United States Patent [19]

Soteropulos et al.

[11] 4,012,892
[45] Mar. 22, 1977

[54] GROUND-ROLLED CYLINDRICAL BALER

[75] Inventors: Gust Soteropulos; Gerald Franklyn Meiers, both of Ottumwa, Iowa

[73] Assignee: Deere & Company, Moline, Ill.

[22] Filed: Aug. 20, 1975

[21] Appl. No.: 605,987

[52] U.S. Cl. .................................................. 56/341
[51] Int. Cl.² ......................................... A01D 39/00
[58] Field of Search ................... 56/341, 343, 16.4; 100/88

[56] References Cited

UNITED STATES PATENTS

| 3,110,145 | 11/1963 | Avery | 56/341 X |
| 3,722,197 | 3/1973 | Vermeer | 56/341 |
| 3,797,215 | 3/1974 | Kopaska | 56/341 |

*Primary Examiner*—J.N. Eskovitz

[57] ABSTRACT

A machine for forming cylindrical bales of crop material includes a mobile main frame and a novel combination of a material pickup and a bale forming belt conveyor in which a plurality of side by side belts are trained around a series of transverse rollers and an axially transverse rotary pickup element at the rear of the frame. The conveyor roller arrangement results in a substantial arc of contact between the conveyor belts and the bale, reaching about 180° when the bale is fully formed. A stripper roller is located adjacent to but forward of and above the pickup element so that, after initiation of the formation of the bale, the pickup continues to feed material from the group into the growing bale but does not contact the bale and takes no part in propelling it along the ground.

13 Claims, 6 Drawing Figures

GROUND-ROLLED CYLINDRICAL BALER

BACKGROUND OF THE INVENTION

This invention relates to machines for forming crop material into cylindrical bales and more particularly to machines in which the bales are formed snowball-like while being rolled along the ground. Such machines are inherently simpler and lower in cost than machines which maintain the material clear of the ground while the bale is being formed. However, even recent machines of this type produce poorly formed bales and suffer substantial crop loss due to imperfect action of the pickup and bale propelling means. In these machines, constant contact between the pickup means and the growing bale tends to increase crop losses, reduce bale density and may retard the propulsion of the bale.

SUMMARY OF THE INVENTION

In this invention improved mechanisms are provided for feeding material into a ground-rolled bale as it is being formed and for controlling its shape and density.

An important feature of our invention is the provision of a pickup means working in conjunction with a stripper roller such that after the rolling of the bale has been initiated, the forming and propelling of the bale is performed entirely by the conveying means, the pickup serving only to feed material to the bale without further contact between the pickup and the material already in the bale.

Another feature of the invention is the provision of a series of belts for forming and propelling the bale having a relatively large arc of contact with the surface of the bale resulting in a more dense and uniform bale and more positive propulsion of the bale.

DESCRIPTION OF THE PREFERRED EMBODIMENT

Figure 4:
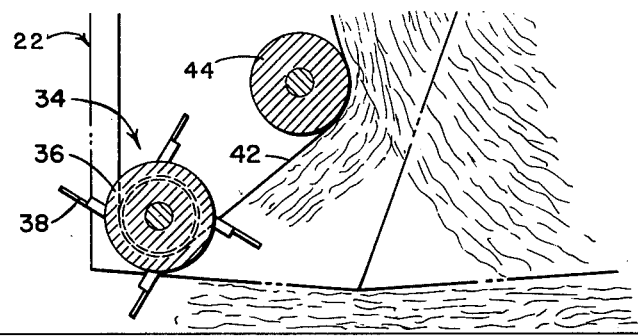
FIG. 4 is a partial side elevation view, cut away and enlarged, showing the pickup mechanism and part of the lower run of the conveyor belts at an intermediate stage in the formation of a bale.

The invention is embodied in a machine for forming cylindrical bales of hay or the like and includes a mobile main frame 10 mounted on a pair of wheels 12. The main frame includes a pair of upright opposite fore-and-aft extending sidewalls 14 and 16 at opposite sides of the main frame, the sidewalls defining a baling chamber therebetween. A transverse beam 18 connects the forward ends of the sidewalls 14 and 16 and a hollow draft member or tongue 20 extends forwardly from the middle of the transverse beam 18 for connecting the baler to a tractor or the like (not shown).

Figure 1:
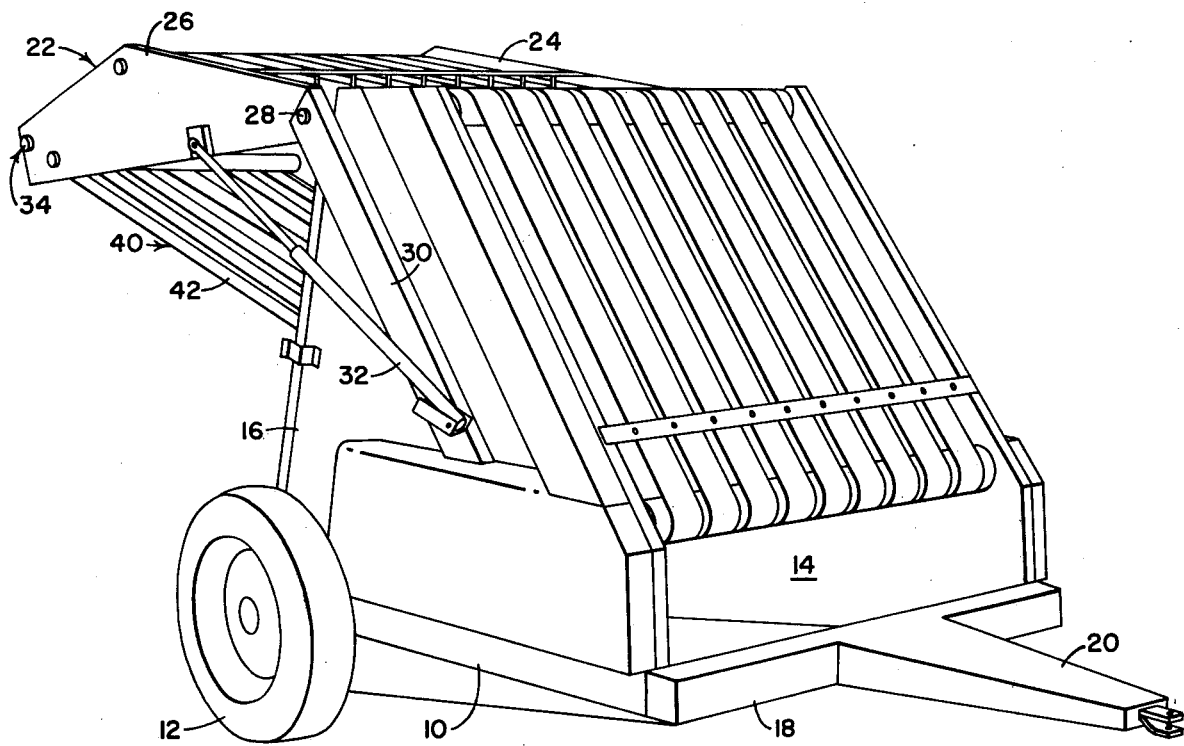
FIG. 1 is a right front perspective of a machine for forming cylindrical bales of crop material including the improved pickup and bale forming mechanisms.

The frame includes a rear gate assembly indicated generally by the numeral 22 and having sidewalls 24 and 26 at opposite sides of the machine functioning as rearward extensions of the sidewalls 14 and 16. The rear gate sidewalls 24 and 26 are connected at their upper ends via pivots 28 to the upper ends of a pair of gate supports 30 mounted on the opposite sidewalls 14 and 16. A pair of hydraulic cylinders 32 respectively extend between the rear gate supports 30 and the rear gate sidewalls 24 and 26 for swinging the rear gate assembly about pivots 28 upwardly and rearwardly from its normal operating position shown in FIG. 2, to a bale discharge position shown in FIGS. 1 and 6.

A pickup mechanism, indicated generally by the numeral 34, is mounted at the lower end of the rear gate assembly 22 and includes a rotary drum 36 and a plurality of fingers 38 extending generally radially from the drum, but inclined away from the direction of rotation of the drum. The pickup mechanism spans the full width of the rear gate assembly and is operative to elevate the crop from the ground as the machine advances and deliver it forwardly and upwardly towards the baling chamber.

Figure 2:
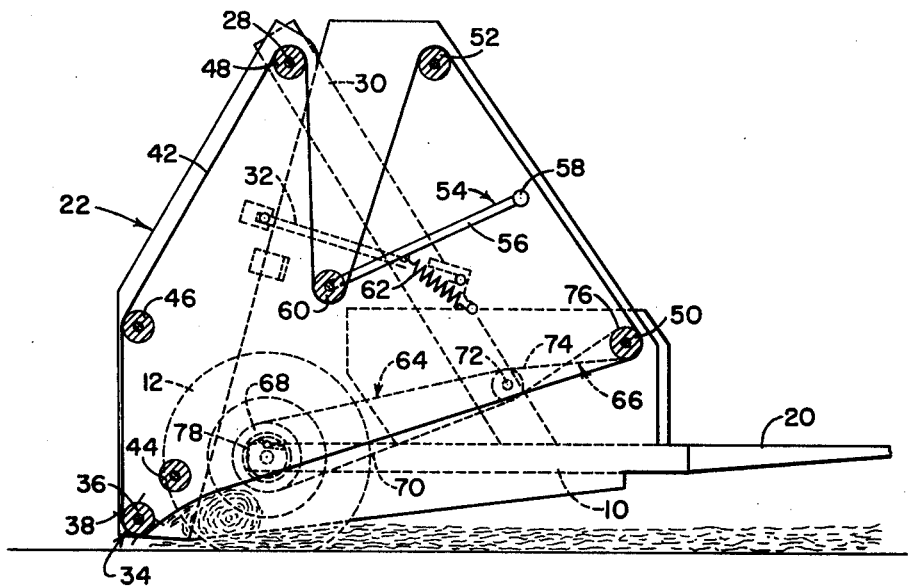
FIG. 2 is a somewhat schematic side elevation view of the machine showing the initiation of a new bale.

A belt-type conveyor indicated generally by the numeral 40 is disposed between the opposite sidewalls 14 and 16 and includes a plurality of endless belts 42 which are disposed side by side across the width of the machine. Three rollers extend between the sidewalls 24 and 26 of the rear gate assembly: a first rear roller 44 adjacently forward of and above and parallel to the axis of the pickup, a second rear roller 46 disposed above and rearwardly of the first roller and an upper rear roller 48 coaxial with the rear gate pivots 28. A lower front roller 50 and an upper front roller 52 respectively extend between the opposite main frame sidewalls 14 and 16 adjacent to their forward edges. The conveyor belts are trained around the two front rollers, the first rear roller, the drum of the pickup and the second and upper rear rollers. The rollers and pickup drum engage the inner sides of the belts, except that at the beginning of the formation of a new bale, the first rear roller 44 is not in contact with the belts because, as shown in FIG. 2, it lies inside the periphery formed by the other rollers and the pickup drum 36. The angle of inclination to the ground of the lower bale engaging run of the conveyor belts as they span the lower front roller 50 and the pickup drum 36 is approximately 20°.

Figure 5:
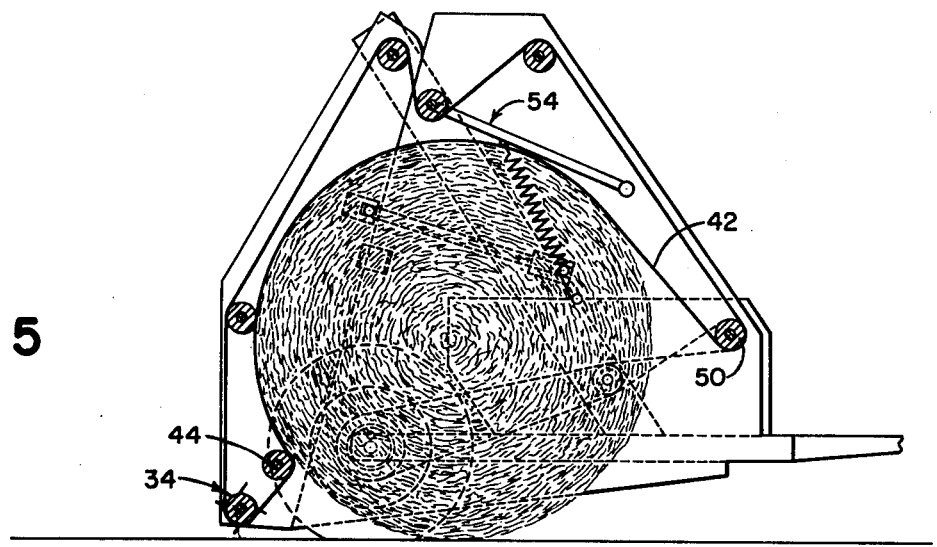
FIG. 5 is a view similar to FIG. 2 but showing a fully formed bale in the machine.

As the bale grows (FIGS. 2, 3 and 4) the belts 42 require substantially increased distances between the lower front roller 50 and the first rear roller 44, and a belt takeup mechanism, indicated generally by the numeral 54, is provided to supply the necessary belt length. The takeup mechanism 54 includes a pair of arms 56 extending rearwardly from a transverse rockshaft 58 between the upper and lower front rollers, the arms 56 being disposed adjacent to the inner sides of the opposite sidewalls 14 and 16. A roller 60 extends between the rearward ends of the arms 56 and engages the outer sides of the belts between the fixed upper front and rear rollers 52 and 48 respectively. A pair of helical tension springs 62 have their lower ends connected to the respective frame sides and their upper ends connected to the arms 56 so that the springs 62 bias the arms and the roller 60 mounted thereon downwardly against the belts. Initially the roller is spaced a substantial distance below the fixed upper front and rear rollers 52 and 48 (FIG. 2), but as the bale grows the arms 56 swing upwardly against the bias of the springs 62 until the bale is fully formed, as shown in FIG. 5. The springs supply an increasing tension in the belts compressing the hay into the bales as they roll the bale.

The conveyor 40 is driven by conventional roller chain and V-belt drives indicated generally by the numerals 64 and 66 respectively so that the lower run of the conveyor between the pickup mechanism 34 and the lower front roller 50 moves forwardly. Power is transmitted from the ground driven wheels 12 to the lower front roller 50 and thus to the belts themselves, through a pair of chain sprockets 68 coaxial with the ground wheels, thence by a pair of roller chains 70 to a pair of jackshaft idlers 72 carrying suitable sprockets and sheaves and thence by a pair of crossed V-belts 74 to sheaves 76 coaxial with and fixed to each end of the lower front roller 50. Conventional ratchet couplings equipped with disengaging means 78 are provided between the ground wheels 12 and the sprockets 68 coaxial with them to accommodate differences in the relative speeds of the ground wheels when maneuvering the machine and to provide a convenient means of disengaging the drive when the machine is to be transported. Drive ratios are such that the speed of the lower run of the conveyor belts relative to the machine is about 10 to 15% less than the forward travel speed of the machine. As previously mentioned, the conveyor belts 42 wrap the pickup drum 36 and thus provide the force necessary to drive the pickup in a counter clockwise direction, as viewed in FIG. 2.

Figure 3:
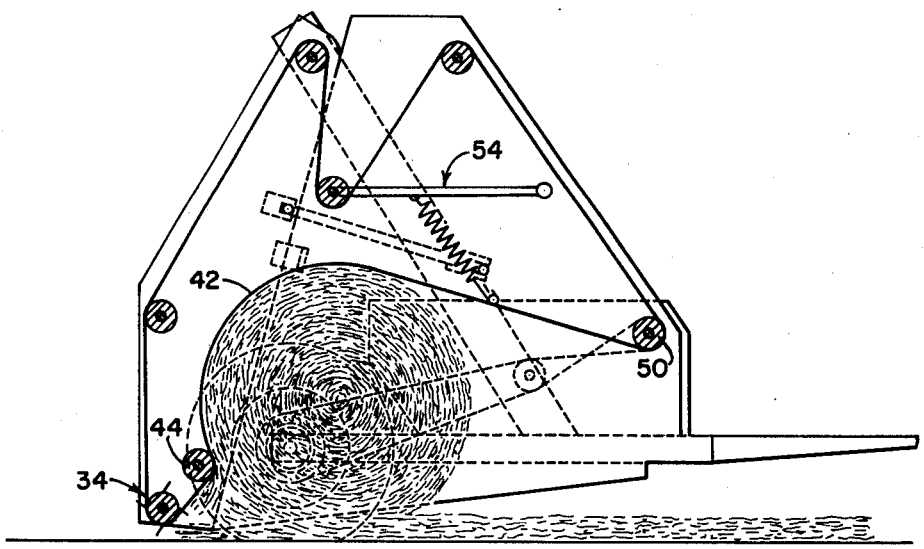
FIG. 3 is a view similar to FIG. 2 but showing an intermediate stage in the formation of a bale.

In operation, the machine is towed in a field of windrowed crop material so that the material enters the machine between the sidewalls as the machine advances. The bale forming operation begins with the pickup 34 engaging the crop material and feeding it forwardly and upwardly to contact the upwardly and forwardly moving lower run of the conveyor belts which cause the windrowed mat of crop material to start to roll snowball fashion into a spiral, generally cylindrical, axially transverse bale as shown in FIG. 2. The driven speed of the conveyor belts and the angle of inclination of their lower run are such that the center of the forming bale is maintained towards the rear of the "pocket" formed between the lower run of the conveyor and the ground. As the bale begins to grow, the lower run of the conveyor belts contacts the first rear roller 44 and thereafter the belts follow an increasingly concave path between the first rear and lower front rollers, 44 and 50 respectively. After the initial formation of the bale, it becomes centered forward of the first rear roller 44 and the roller becomes operative, because of its position relative to the pickup, to maintain the bale out of engagement with the pickup teeth as shown in FIGS. 3, 4 and 5.

As the bale grows the takeup mechanism 54 applies an increasing tension in the belts so that the conveyor compresses the bale as it rolls it along the ground.

The lower front roller 50 is at substantially the same level as the axis of a fully formed bale to that the arc of contact of the lower run of the conveyor with a fully formed bale is approximately 180°, as shown in FIG. 5. To produce a well formed bale of controlled density, the conveyor belts must envelop the bale as far as possible and an arc of contact (with a fully formed bale) of at least 150° is desirable.

Figure 6:
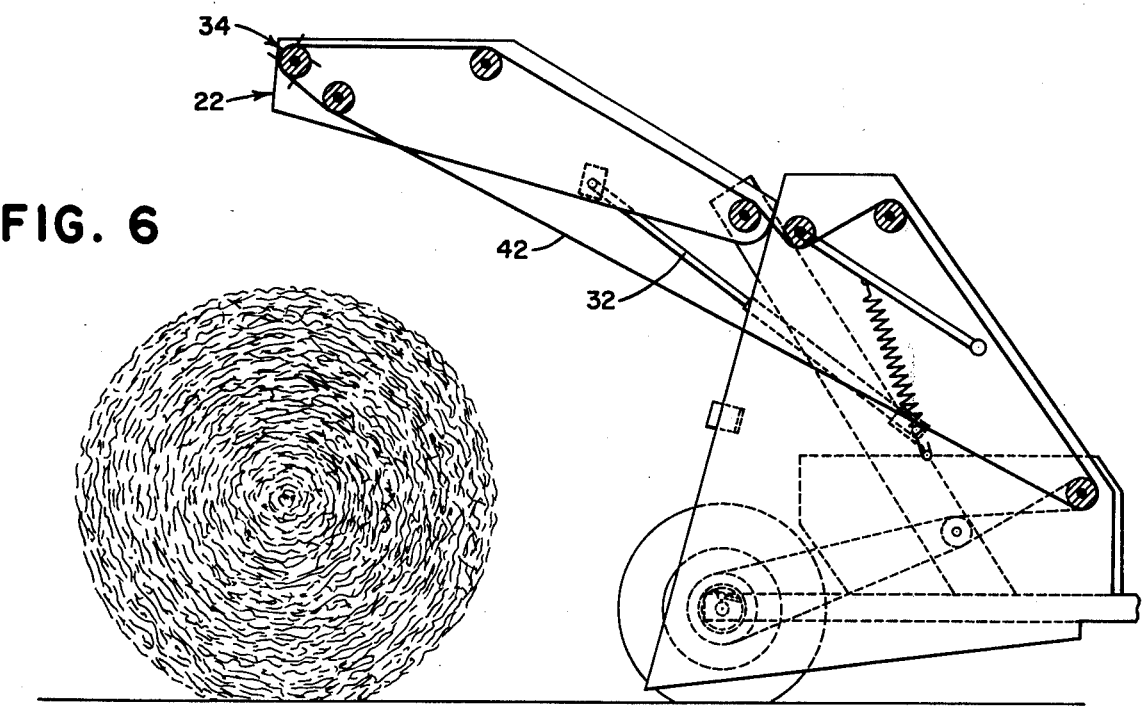
FIG. 6 is also similar to FIG. 2 but showing the machine immediately after discharging a fully formed bale.

After the bale is fully formed as shown in FIG. 5, the hydraulic cylinders 32 are extended to raise the rear gate assembly 22 whereby the pickup and conveyor clear the bale as the machine advances, discharging the bale as shown in FIG. 6.

We claim:

1. A machine for removing crop material from the ground and rolling it into cylindrical bales comprising: a mobile frame having opposite sides; a pickup means mounted on the frame between the opposite sides and including an axially transverse rotary element mounted on a lower rearward portion of the frame adjacent the ground and having generally radially extending pickup elements operatively associated therewith for moving forwardly and upwardly about the axis of the rotary element to engage and elevate crop material lying on the ground; and conveyor means operative to engage crop material elevated by the pickup means and roll it along the ground into a spiral, axially transverse, generally cylindrical bale and including a first roller means adjacently forward and above and parallel to the rotary element and operative to support the rear of the bale as it is rolled along the ground after it is partially formed and maintain the bale out of engagement with the pickup element.

2. The invention defined in claim 1 wherein the conveyor means includes a second roller means above the first roller means and the conveyor means includes at least one endless flexible element trained around the first and second roller means.

3. The invention defined in claim 2 and including a third roller means coaxial with the rotary pickup element and having the endless flexible element trained also around the third roller means, the endless flexible element engaging the first roller means after the bale has started forming.

4. The invention defined in claim 3 wherein the rotary element includes a drum and finger means mounted on and extending generally radially from the drum.

5. The invention defined in claim 4 wherein the frame includes a rear gate structure on which the first and second roller means and the rotary element are mounted, the gate structure being swingable upwardly and rearwardly from an operating position, wherein the finger means are adjacent to ground, to a raised discharge position, wherein the conveyor means and the pickup means clear a bale for rearward discharge thereof.

6. The invention defined in claim 4 wherein the finger means of the rotary pickup element are generally radial but inclined away from the direction of rotation of the element.

7. The invention defined in claim 2 wherein the conveyor means includes a front roller means extending between the opposite sides forwardly of the first roller means and forwardly of the bale formed by the machine, the endless flexible element being trained around the front roller means and having a lower bale engaging run between the first and the front roller means enveloping at least 150° of the circumference of a fully formed bale.

8. The invention defined in claim 7 and including an axially transverse rear roller means mounted on the frame rearwardly of and above the first roller means and engaging the endless flexible element.

9. The invention defined in claim 8 wherein the endless flexible element includes a plurality of side by side belts trained around the roller means and including a belt take-up mechanism engageable with the belts to tension the belts and provide belt length to accommodate the growth of the bale partially enveloped by the belts.

10. The invention defined in claim 7 wherein the angle of inclination to the ground of the lower bale engaging run of the endless flexible element when initiating the formation of a bale is approximately 20°.

11. A machine for removing crop material from the ground and rolling it into cylindrical bales, comprising: a mobile frame having opposite sides and adapted to move across the field with the crop entering the machine between the opposite sides; an axially transverse rotary pickup means mounted on a lower rearward portion of the frame between the opposite sides and including an axially transverse rotary element and a plurality of generally radial finger means mounted on the rotary element and operative to engage and elevate crop material lying on the ground as the machine advances; an axially transverse stripper roller disposed adjacent to the rotary pickup element; a rear roller mounted on the frame parallel to and above the rotary element; a forward roller journaled on the frame forwardly of and parallel to the rotary element and above the path of crop material moving to the pickup means; a pair of transverse upper rollers journaled on the frame above the front and rear rollers; and a plurality of endless flexible belts trained around said rollers and said rotary element and having an upwardly and forwardly moving lower run between the rotary pick element and the front roller and adapted to engage crop material elevated by the pickup means and roll it in snowball fashion along the ground into a generally cylindrical, spiral, axially transverse bale, the stripper roller operatively engaging the belts after partial formation of the bale to support the rearward side of the bale out of engagement with the finger means and the forward roller being disposed in relation to the stripper roller so that the lower run of the conveyor envelops at least 150° of a fully formed bale; and a belt take-up mechanism mounted on the frame and including an axially transverse roller between the two upper rollers and journaled in a pair of vertically swingable arms, the take-up roller engaging the opposite side of the belts from the other rollers and including means biasing the arms downwardly to provide tension in said belts, the arms swinging upwardly against said biasing means to provide additional belt length to accommodate the growth of a bale.

12. The invention defined in claim 11 wherein the finger means of the rotary pickup element are generally radial but inclined away from the direction of rotation of the element.

13. The invention defined in claim 11 wherein the angle of inclination to the ground of the lower run of the endless flexible belts is approximately 20°.

* * * * *